United States Patent
Lindoff et al.

(10) Patent No.: US 8,711,811 B2
(45) Date of Patent: Apr. 29, 2014

(54) IDENTIFYING MULTI-COMPONENT CARRIER CELLS

(75) Inventors: Bengt Lindoff, Bjärred (SE); Erik Dahlman, Bromma (SE); Ylva Jading, Stockholm (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1090 days.

(21) Appl. No.: 12/326,658

(22) Filed: Dec. 2, 2008

(65) Prior Publication Data

US 2009/0316659 A1  Dec. 24, 2009

Related U.S. Application Data

(60) Provisional application No. 61/073,793, filed on Jun. 19, 2008.

(51) Int. Cl.
*H04W 4/00* (2009.01)
(52) U.S. Cl.
USPC ............ 370/332; 370/331; 370/334; 370/336
(58) Field of Classification Search
None
See application file for complete search history.

(56) References Cited

U.S. PATENT DOCUMENTS

| | | | |
|---|---|---|---|
| 2004/0125768 A1* | 7/2004 | Yoon et al. | 370/331 |
| 2006/0274712 A1* | 12/2006 | Malladi et al. | 370/345 |
| 2007/0157279 A1* | 7/2007 | Hara et al. | 725/124 |
| 2007/0183307 A1 | 8/2007 | Hidenori et al. | |
| 2008/0031368 A1 | 2/2008 | Lindoff et al. | |
| 2008/0057966 A1* | 3/2008 | Kwon | 455/446 |
| 2008/0267303 A1 | 10/2008 | Baldemair et al. | |

FOREIGN PATENT DOCUMENTS

EP  1919246 A1  5/2008

OTHER PUBLICATIONS

R. Attar et al., Evolution of cdma2000 Cellular Networks: Multicarrier EV-DO, IEEE Communications Magazine, Mar. 1, 2006, pp. 46-53, vol. 44, No. 3, IEEE, Piscataway, NJ.
T. Motohiro et al., Evolved UTRA—Physical Layer Overview, 8th Workshop on Signal Processing Advances in Wireless Communications SPAWC 2007, Jun. 1, 2007, pp. 1-8, IEEE, Piscataway, NJ.
International Search Report in PCT/EP2009/056799, Sep. 16, 2009, pp. 1-4, EPO.
3GPP Technical Report TR 25.814 V7.0.0, Physical Layer Aspects for Evolved Universal Terrestrial Radio Access (UTRA), Release 7, Jun. 2006, Section 7.1.1.2.2.
3GPP Technical Specification TS 36.211 V8.1.0, Physical Channels and Modulation, Release 8, Nov. 2007.

* cited by examiner

*Primary Examiner* — Anez Ebrahim
(74) *Attorney, Agent, or Firm* — Potomac Patent Group PLLC (57) ABSTRACT

Methods and apparatus for generating and determining multi-component carrier cells, without the use of neighbor-cell lists, are described. Methods for generating and informing a communication system terminal about other component carriers belonging to a certain cell identity (ID), and methods and apparatus for a mobile terminal utilizing extended synchronization information for doing multi-component carrier cell search are described. Also, methods for multi-component carrier measurements and methods of reporting such measurements to a network are described.

31 Claims, 8 Drawing Sheets

IDENTIFYING MULTI-COMPONENT CARRIER CELLS

CROSS-REFERENCE TO RELATED APPLICATION

This application claims the benefit of the filing date of U.S. Provisional Patent Application No. 61/073,793 filed on Jun. 19, 2008, which is incorporated here by reference.

TECHNICAL FIELD

This invention relates to radio communication systems and more particularly to measurement of received signal power in such systems.

BACKGROUND

In forthcoming evolutions of cellular radio communication system standards, such as Long Term Evolution (LTE) and High-Speed Packet Access (HSPA), the maximum data rate will surely be higher than in previous systems. Higher data rates typically require larger system channel bandwidths. For an IMT advanced system (i.e., a "fourth generation" (4G) mobile communication system), bandwidths of 100 megahertz (MHz) and larger are being considered.

LTE and HSPA are sometimes called "third generation" communication systems and are currently being standardized by the Third Generation Partnership Project (3GPP). The LTE specifications can be seen as an evolution of the current wideband code division multiple access (WCDMA) specifications. An IMT advanced communication system uses an internet protocol (IP) multimedia subsystem (IMS) of an LTE, HSPA, or other communication system for IMS multimedia telephony (IMT). The 3GPP promulgates the LTE, HSPA, WCDMA, and IMT specifications, and specifications that standardize other kinds of cellular wireless communication systems.

An LTE system uses orthogonal frequency division multiplex (OFDM) as a multiple access technique (called OFDMA) in the downlink (DL) from system nodes to user equipments (UEs). An LTE system has channel bandwidths ranging from 1.25 MHz 30 to 20 MHz, and supports data rates up to 100 megabits per second (Mb/s) on the largest-bandwidth channels. One type of physical channel defined for the LTE downlink is the physical downlink shared channel (PDSCH), which conveys information from higher layers in the LTE protocol stack and is mapped to one or more specific transport channels. The PDSCH and other LTE channels are described in 3GPP Technical Specification (TS) 36.211 V8.1.0, Physical Channels and Modulation (Release 8) (November 2007), among other specifications.

In an OFDMA communication system like LTE, the data stream to be transmitted is portioned among a number of narrowband subcarriers that are transmitted in parallel. In general, a resource block devoted to a particular UE is a particular number of particular subcarriers used for a particular period of time. A resource block is made up of resource elements, each of which is a particular subcarrier used for a smaller period of time. Different groups of subcarriers can be used at different times for different users. Because each subcarrier is narrowband, each subcarrier experiences mainly flat fading, which makes it easier for a UE to demodulate each subcarrier. Like many modern communication systems, DL transmissions in an LTE system are organized into frames of 10 milliseconds (ms) duration, and each frame typically includes twenty successive time slots. OFDMA communication systems are described in the literature, for example, U.S. Patent Application Publication No. US 2008/0031368 A1 by B. Lindoff et al.

Figure 1:
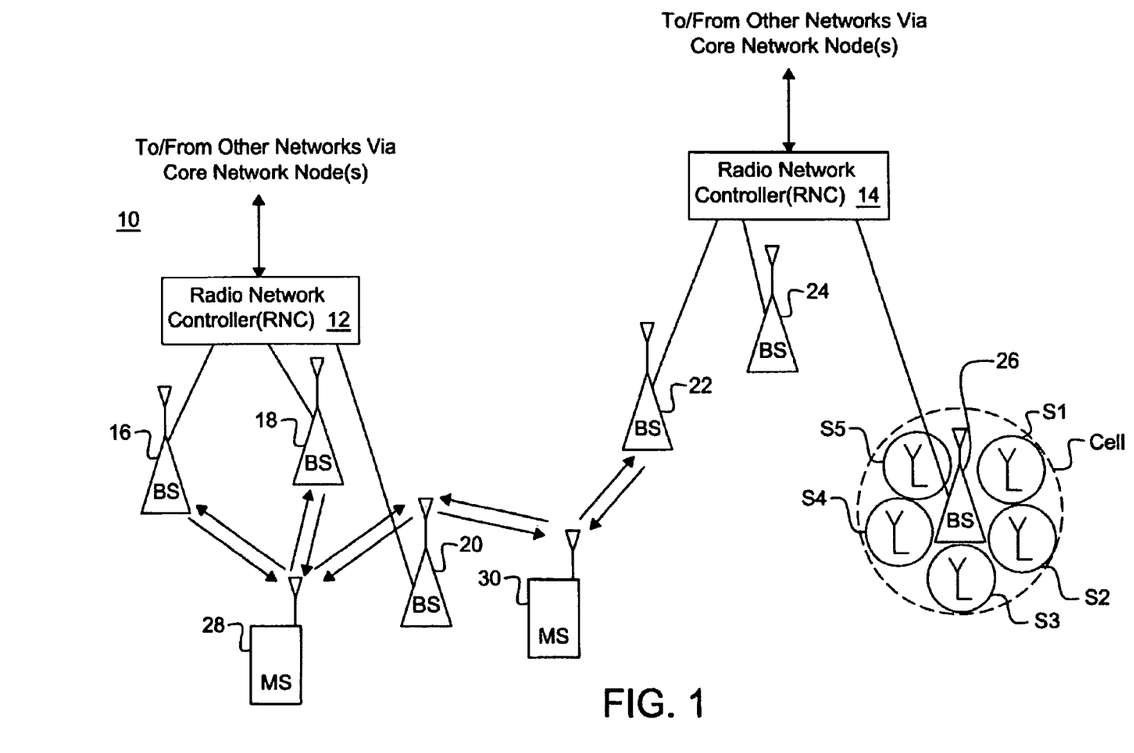
FIG. 1 depicts a cellular communication system.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or Node B in 3G vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in LTE and other communication systems. For example, the functionality of the RNCs 12, 14 can be moved to the Node Bs 22, 24, 26, and other functionalities can be moved to other nodes in the network. It will also be understood that a base station can use multiple transmit antennas to transmit information into a cell/sector/area, and those different transmit antennas can send respective, different pilot signals.

Fast and efficient cell search and received signal power measurements are important for a UE to get and stay connected to a suitable cell, which can be called a "serving cell", and to be handed over from one serving cell to another. In current LTE specifications, handover decisions are based on measurements of reference signal received power (RSRP), which can be defined as the average UE-received signal power of reference signals or symbols (RS) transmitted by a Node B. A UE measures RSRP on its serving cell as well as on neighboring cells that the UE has detected as a result of a specified cell search procedure.

Figure 2:
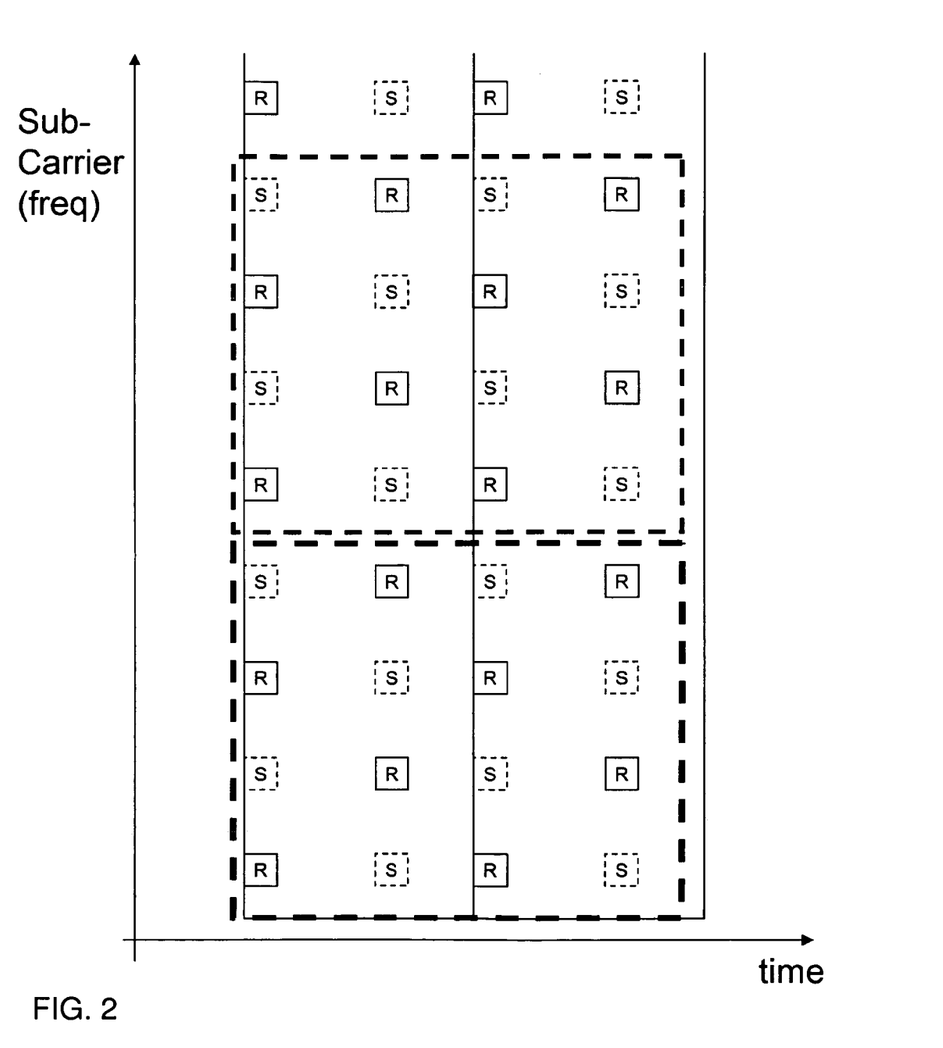
FIG. 2 depicts reference signals in a communication system that uses orthogonal frequency division multiple access.

The RS, or pilots, are transmitted from each Node B at known frequencies and time instants, and are used by UEs for synchronization and other purposes besides handover. Such reference signals and symbols are described for example in Section 7.1.1.2.2 of 3GPP Technical Report (TR) 25.814 V7.0.0, Physical Layer Aspects for Evolved Universal Terrestrial Radio Access (UTRA) (Release 7), June 2006, and Sections 6.10 and 6.11 of 3GPP TS 36.211 cited above. RS are transmitted from each of possibly 1, 2, or 4 transmit antennas of a Node B on particular resource elements (REs) that can be conveniently represented on a frequency-vs.-time plane as depicted in FIG. 2. It will be understood that the arrangement of FIG. 2 is just an example and that other arrangements can be used.

FIG. 2 shows two successive time slots, indicated by the vertical solid lines, which can be called a sub-frame in an LTE system. The frequency range depicted in FIG. 2 includes about twenty-six subcarriers, only nine of which are explicitly indicated. RS transmitted by a first transmit (TX) antenna of a Node B are denoted R and by a possible second TX antenna in the node are denoted by S. In FIG. 2, RS are depicted as transmitted on every sixth subcarrier in OFDM symbol 0 and OFDM symbol 3 or 4 (depending on whether the symbols have long or short cyclic prefixes) in every slot. Also in FIG. 2, the RSs in symbols 3 or 4 are offset by three subcarriers relative to the RS in OFDM symbol 0, the first OFDM symbol in a slot.

Besides reference signals, synchronization signals are needed during cell search. LTE uses a hierarchical cell search scheme similar to WCDMA in which synchronization acquisition and cell group identifier are obtained from different synchronization channel (SCH) signals. Thus, a primary synchronization channel (P-SCH) signal and a secondary synchronization channel (S-SCH) signal are defined with a pre-defined structure in Section 6.11 of 3GPP TS 36.211. For example, P-SCH and S-SCH signals can be transmitted on particular subcarriers in particular time slots. Primary and secondary synchronization signals are described in U.S. patent application Ser. No. 12/024,765 filed on Feb. 1, 2008, by R. Baldemair et al. for "Improved Synchronization for Chirp Sequences".

Problems can arise in such communication systems because the radio spectrum is a limited resource that must be shared by many systems and operators. For example, it is difficult to find unused continuous blocks of radio frequency (RF) spectrum that are at least 100-MHz wide. One way to solve such problems is to aggregate contiguous and non-contiguous blocks of RF spectrum and thereby—from a base-band point of view—obtain a large enough system RF bandwidth.

Figure 3:
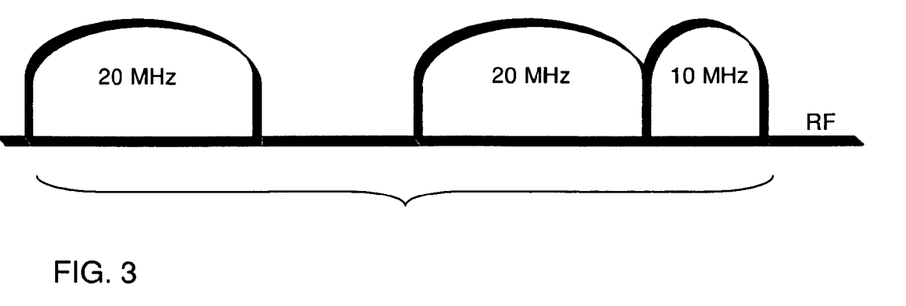
FIG. 3 depicts aggregation of radio frequency spectrum.

FIG. 3 depicts such RF spectrum aggregation, showing two non-contiguous blocks of 20 MHz and one block of 10 MHz, which is contiguous with one of the 20-MHz blocks, aggregated for a total RF bandwidth of 50 MHz. As seen in FIG. 3, the aggregated blocks can be contiguous or non-contiguous, and the artisan will understand that the blocks shown are compliant with the LTE (3GPP Release 8, or Rel-8) specifications.

One benefit of RF aggregation is that it is possible to obtain system RF bandwidths that are large enough to support data rates of one gigabit per second (Gb/s) and even higher, which is a throughput requirement for 4 G communication systems like the IMT-advanced system. Furthermore, RF aggregation makes it possible to adapt the aggregated blocks of RF spectrum to a current communication situation and geographical position, thus giving a communication system desirable flexibility.

The simple RF aggregation described above can even be modified by introducing multi-carrier aggregation, which is to say, aggregation of segments of RF spectrum that are available on different radio carrier signals. Such carrier signals would be carriers in the same cell, for example, an LTE cell, and such a cell can be said to have a "multi-component carrier" or to be a "multi-carrier cell". A "multi-carrier" LTE UE would simultaneously receive multiple LTE carrier signals that have different frequencies and different bandwidths.

Current cell search techniques in LTE and other communication systems can handle only single-carrier cells, i.e., systems where each cell identity (ID) is associated with a continuous segment of RF bandwidth. After a UE has detected a cell ID on a certain carrier frequency, the UE has, by definition in the current techniques, determined a cell and its cell ID. Thus, if a cell is a multi-carrier cell and a UE has detected a cell ID on a carrier frequency, current cell search techniques say nothing about how to detect a cell ID or cell IDs belonging to other carriers having other frequencies in the same multi-carrier cell.

One solution to this short-coming is to have the current serving cell inform the UE about suitable carrier frequencies and cell IDs on neighboring cells, which is to say that the UE can receive a list of neighbor cells. Nevertheless, that solution is undesirable, as it was in previous cellular communication systems, because it requires extensive cell planning and site coordination, which are typically expensive tasks, and uses system resources for transmitting the neighbor-cell lists.

Therefore, there is a need for methods and apparatus describing how to detect cells and do measurements on cells in a multi-component carrier cellular system without the need for neighbor-cell lists.

SUMMARY

In accordance with aspects of this invention, there is provided a method of searching for a cell having a multi-component carrier in a radio communication system. The method includes receiving a signal transmitted by the cell on a carrier frequency having a first predetermined frequency; determining a first cell ID based on the received signal according to a cell search procedure carried out on received signals at the first predetermined frequency; reading extended synchronization information about multi-component carriers that is broadcast by the cell on first predetermined frequency, wherein the extended synchronization information includes a second cell ID associated with a second predetermined carrier frequency; based on the extended synchronization information, carrying out a cell search procedure on received signals at the second predetermined carrier frequency in order to determine the cell having the second cell ID; and if the second cell ID is detected, measuring powers of received signals at the first and second predetermined frequencies.

Also in accordance with aspects of this invention, there is provided an apparatus in a receiver for searching for a cell having a multi-component carrier in a radio communication system. The apparatus includes a device for receiving a signal transmitted by the cell on a carrier frequency having a first predetermined frequency; and an electronic processing device configured to determine a first cell ID based on the received signal according to a cell search procedure carried out on received signals at the first predetermined frequency. The electronic processing device is further configured to read extended synchronization information about multi-component carriers that is broadcast by the cell on the first predetermined frequency; the extended synchronization information includes a second cell ID associated with a second predetermined carrier frequency; and based on the extended synchronization information, the electronic processing device is further configured to carry out a cell search procedure on received signals at the second predetermined carrier frequency in order to determine the cell having the second cell ID.

Also in accordance with aspects of this invention, there is provided a method of enabling searching for a cell having a multi-component carrier in a radio communication system. The method includes generating a signal to be transmitted by the cell on a carrier frequency having a first predetermined frequency. The signal includes a first cell ID and extended synchronization information about multi-component carriers, and the extended synchronization information includes a second cell ID associated with a second predetermined carrier frequency.

Also in accordance with aspects of this invention, there is provided an apparatus for a transmitter of a cell having a multi-component carrier in a radio communication system. The apparatus includes at least first and second synchronization signal generators; and a control unit configured to provide and receive control and other signals to and from the at least first and second sync signal generators. The first and second generators include respective first and second cell ID information in extended information included in first and second synchronization signals produced by the at least first and second generators; and the first and second cell ID information correspond to respective component carriers of the multi-component carrier.

BRIEF DESCRIPTION OF THE DRAWINGS

The several features, objects, and advantages of this invention will be understood by reading this description in conjunction with the drawings, in which.

DETAILED DESCRIPTION

This description focuses on an example communication system in which multi-carrier cells have two component carriers, but the artisan will understand that the invention in general covers systems in which multi-carrier cells have an integer N component carriers, where N>1.

Figure 4A:
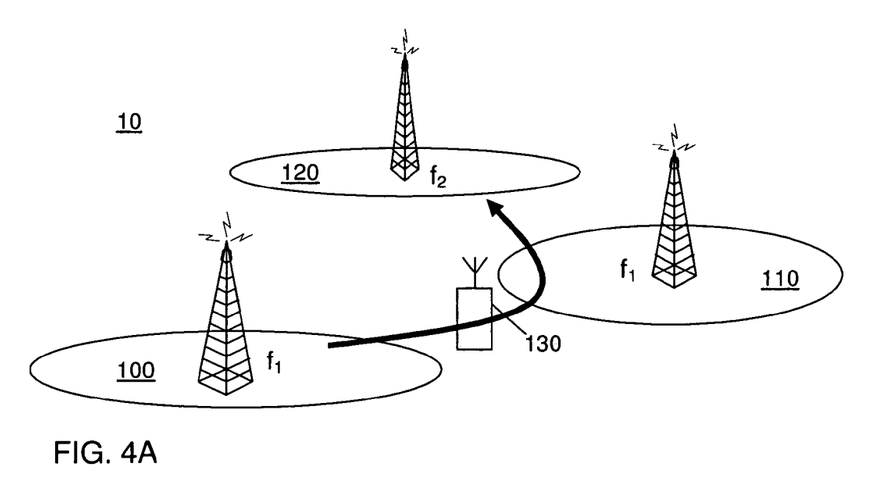
FIGS. 4A, 4B depict communication systems having single-component and multi-component carriers, respectively.

FIG. 4A is another representation of the communication system 10 depicted in FIG. 1. In the typical LTE/HSPA system 10, a UE 130 is connected to a cell 100 on a carrier having a frequency f1. The UE 130, on a regular basis, carries out a specified cell search procedure for identifying cells on the same carrier frequency f1. This is usually called intra-frequency cell search. After a new cell on frequency f1 is detected, for example cell 110, by detecting the cell ID for cell 110, and measurements indicate that the detected cell is more suitable as a serving cell than the cell 100, the UE undergoes handover (HO) to the new cell 110. If there is no more suitable cell on that carrier frequency and the UE is going out of its serving cell's coverage area (as depicted by the arrow), the UE recognizes a need to carry out a specified inter-frequency cell search procedure and signal measurements. The network 10 typically informs the UE 130 about other carrier frequencies to search on, e.g., carrier frequency f2 that in this example is used by cell 120. In other words, the UE 130 receives a neighbor-cell list transmitted by the cells 100, 110, and after the UE finds a new suitable cell 120 on the carrier frequency f2, an inter-frequency HO takes place.

Figure 4B:
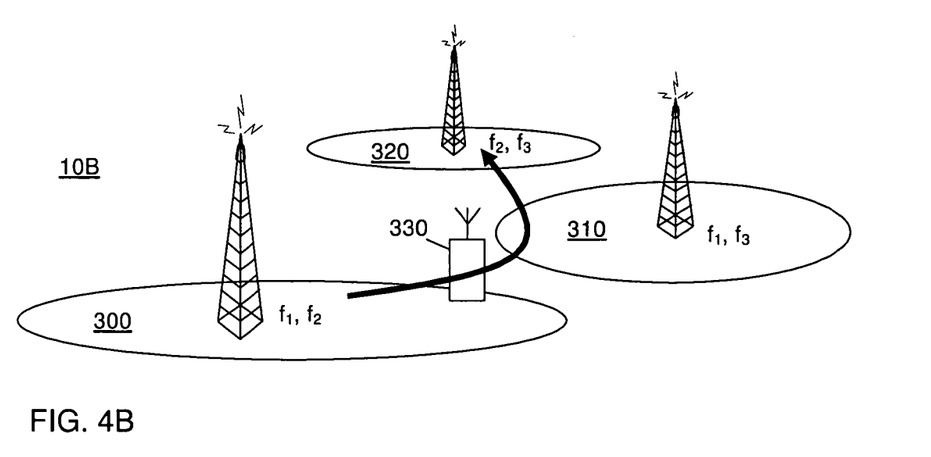

FIG. 4B depicts a multi-component carrier communication system 10B, which is a modification of the typical single-component carrier system 10. It will be understood that the system 10B can include legacy single-component carrier cells at the same cell sites but on different carrier frequencies as multi-component carrier cells. In FIG. 4B for example, the cell site 300 can have two legacy cells having respective cell IDs on respective carrier frequencies f1, f2; cell sites 310, 320 are arranged in a similar way. A multi-carrier UE 330 in the system 10B carries out cell search and measurements in order to be able to handle mobility.

With current cell search techniques, after the UE 330 has determined a cell ID on a carrier frequency, the UE has detected a cell, but for cells having multi-component carriers, e.g., sites 300, 310, 320, when the UE 330 has detected a cell ID on, say, frequency f1, the current cell search techniques do not specify how to detect the cell ID(s) belonging to the same multi-component carrier on another carrier frequency, say, frequency f2.

Figure 5:
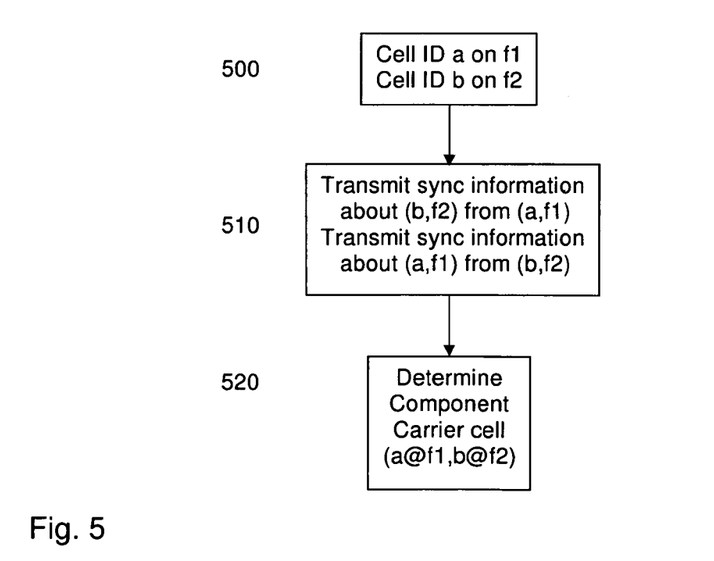
FIG. 5 is a flow chart of a method of generating and informing component carrier cell identity information.

FIG. 5 is a flow chart of a method of generating and informing component carrier cell ID information that can be used in a communication system 10B such as that depicted in FIG. 4B. The method associates different cell IDs on different carrier frequencies, such as cell IDs of legacy LTE or HSPA cells, with a multi-component carrier cell ID (i.e., component carriers belonging to the same multi-carrier cell). In the example network 10B depicted in FIG. 4B, legacy cells use different carrier frequencies, e.g., frequencies f1, f2, and a multi-component carrier cell comprises, for example, two such cells placed at the same site (e.g., sites 300, 310, 320). The arrangement of FIG. 4B is depicted in FIG. 5 by block 500, which shows that there is a cell ID a on frequency f1 and a cell ID b on frequency f2.

In order for the multi-carrier UE 330 to find cell ID b at frequency f2 when doing cell search on carrier frequency f1, the cell a broadcasts on frequency f1 extended synchronization information (step 510) that includes information about cell ID b on carrier frequency f2. In a similar way, the cell b broadcasts (step 510) on frequency f2 extended synchronization information that includes information about cell ID a on carrier frequency f1 in order for the UE 330 to find cell ID a at frequency f1 when doing cell search on carrier frequency f2. The extended synchronization signal information can be sent on any suitable logical and physical channels transmitted by the cells, and such methods are described in more detail below. In step 520, the UE 330 determines that it is in a multi-component carrier cell, with cell ID a on frequency f1 and cell ID b on frequency f2, by detecting the extended synchronization information. The UE can then carry out an improved cell search procedure that uses the extended synchronization information.

Figure 6:
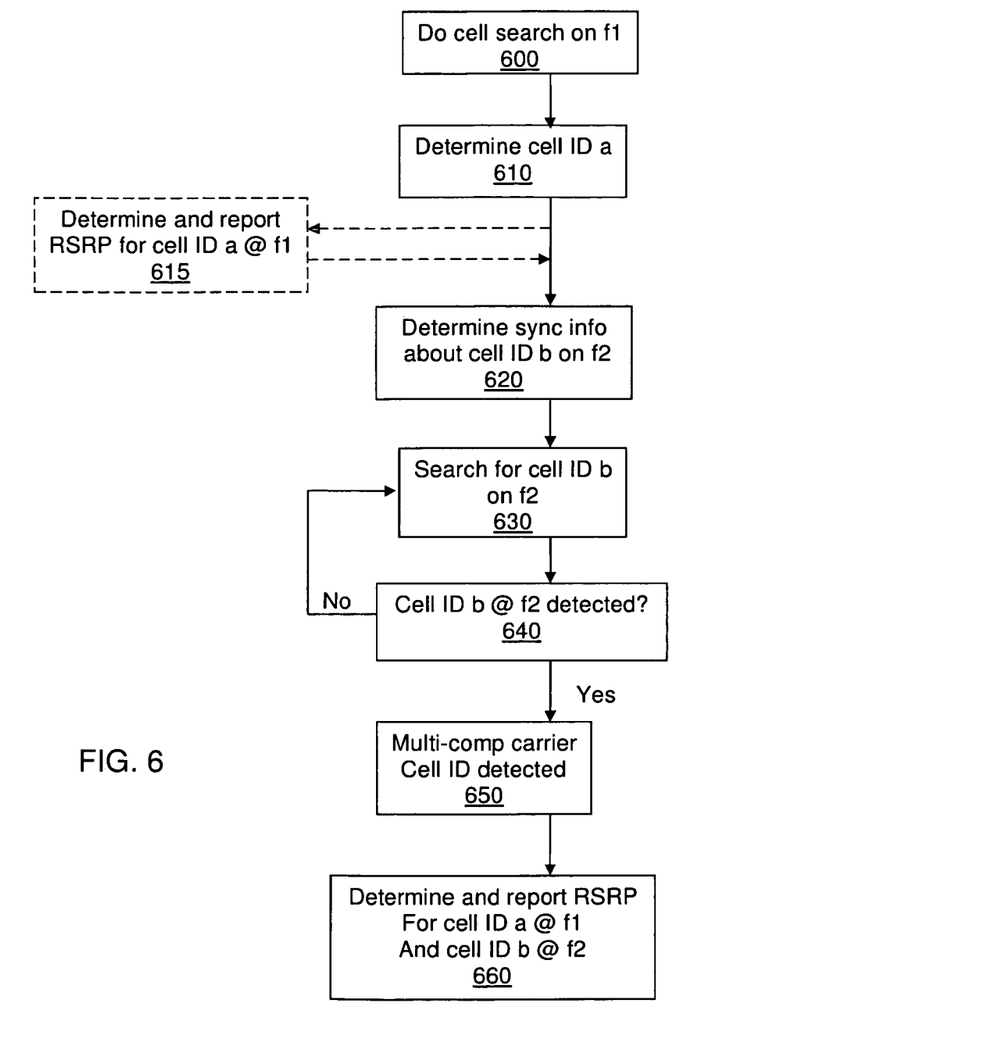
FIG. 6 is flow chart of improved cell search methods for a multi-component carrier.

FIG. 6 is flow chart of a multi-carrier cell search method for a multi-component carrier that can be carried out by a UE 330. The UE is connected to a cell on a certain carrier frequency, say, frequency f1, and in step 600, the UE does a cell search according to any known technique on frequency f1. In step 610, the UE's cell search locates a cell having cell ID a, and in step 620, the UE reads any extended synchronization information about possible multi-component carriers that may be broadcast by the cell on frequency f1. As explained above, the extended synchronization information can include the cell ID b at carrier frequency f2.

Based on the extended synchronization information, the UE, on a regular basis, does a cell search on frequency f2 in order to detect the cell having cell ID b (step 630). If the UE determines cell ID b (Yes in step 640), the UE has detected a multi-component carrier cell (step 650) and performs appropriate received-signal measurements on frequencies f1 and f2 (e.g., the UE measures RSRP, RSRQ, etc.) on a regular basis and reports the measurements to the network (step 660). RSRQ (reference signal received quality) is usually defined as the ratio N×RSRP/RSSI, where N is the integer number of resource blocks (RBs) of the carrier RSSI measurement bandwidth, and RSSI is the received signal strength indication. The measurements in the numerator and denominator are made over the same set of resource blocks.

The received-signal measurements are done according to any known techniques on each component carrier and then combined to determine a combined RSRP (or similar) measurement. For example, the combination can be a weighted sum as follows:

$$RSRP\_MC = \alpha * RSRP\_cell\_ID\_a + (1-\alpha) * RSRP\_cell\_ID\_b$$

in which RSRP_MC is the combined RSRP of a multi-carrier cell, α is a weight factor, RSRP_cell_ID_a is the measured RSRP of cell ID a on frequency f1 in this example, and RSRP_cell_ID_b is the measured RSRP of cell ID b on frequency f2 in this example.

The weight factor α can be 0.5 (i.e., the component carrier RSRPs are arithmetically averaged), but the weight factor α can also vary, leading to different contributions by the different component carriers. Furthermore, the weight factor α can be determined either by the network or by the UE, and can for instance be a function of the measurement cycle on the different component carriers (which can be a function of discontinuous reception (DRX) cycles set on an anchor carrier relative to extended component carriers, etc.). A UE typically allocates a large amount of its receiver resources to the anchor carrier, i.e., the carrier (or carriers) on which the UE receives control information, and so the UE typically makes more accurate measurements on the "always on" anchor carrier. On other component carriers—for power saving—the UE only needs to listen (and do measurements) a fraction of the time (i.e., in the DRX cycles), and so the UE typically makes less accurate measurements on the other, non-anchor, component carriers. Accordingly, a lower weight factor may be given to such other carriers.

An advantage of having the weight factor α determined by the network is that the network has control of the amount of RSRP originating from different component carriers, and hence can make better hand-over decisions by using this information and its knowledge of the current load situation. The network also can decide which component carrier should be the anchor carrier. Having the weight factor α determined by the UE mainly addresses power-consumption issues. The UE might put lower weights on some carriers and then not need to allocate so much receiver resources for measurements on those carriers. It is currently believed that having the weight factor α determined by the network is preferable.

The description above is based on the assumption that a UE does not start to do measurements on a new cell until all component carrier cell IDs have been detected, but that is not necessary. As depicted in FIG. 6, a cell search method can optionally include step 615, by which the UE starts to measure (and report) RSRP on already detected component cell IDs even if not all component carriers have been detected. The other steps of the procedure (steps 600-660) are the same as described above. In its reporting (step 615 or step 660) to a Node B, the UE can also optionally include information about the number of component carriers that have been detected. Such information can be used by the network in the HO decision process.

For example, the UE can send its measurement reports as radio resource control (RRC) measurement reports according to the well known procedures used in HSPA/WCDMA and LTE for such messages. In this case, the usual RRC measurement reports are readily extended to include information covering the multi-carrier components. In addition, the UE can report one or both of RSRP and RSRQ for each component carrier in respective RRC messages, but an RRC message can include a vector representation of RSRP and/or RSRQ measurements of plural component carriers. The artisan will understand that a vector representation of, for example, RSRP is simply an ordered array of individual component carrier RSRPs.

Figure 7:
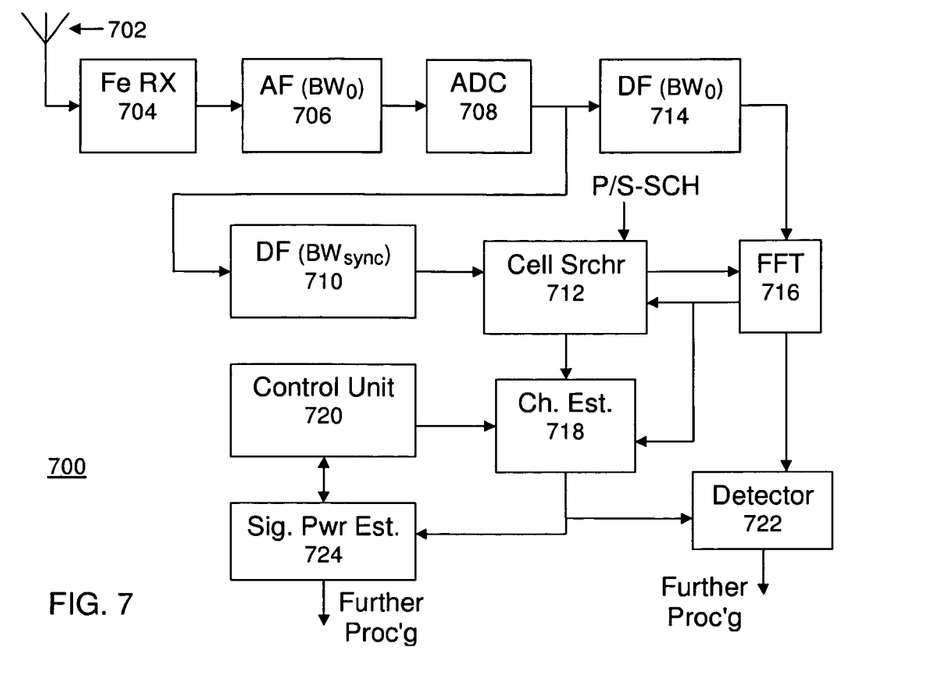
FIG. 7 is a block diagram of a portion of a receiver in a cellular communication system.

FIG. 7 is a block diagram of a portion 700 of a UE that can implement the methods described above. It will be appreciated that the functional blocks depicted in FIG. 7 can be combined and re-arranged in a variety of equivalent ways, and that many of the functions can be performed by one or more suitably programmed digital signal processors or other known electronic circuits.

As depicted in FIG. 7, a UE receives a DL radio signal through an antenna 702 and typically down-converts the received radio signal to an analog baseband signal in a front end receiver (Fe RX) 704. The baseband signal is spectrally shaped by an analog filter 706 that has a bandwidth $BW_0$, and the shaped baseband signal generated by the filter 706 is converted from analog to digital form by an analog-to-digital converter (ADC) 708.

The digitized baseband signal is further spectrally shaped by a digital filter 710 that has a bandwidth $BW_{sync}$, which corresponds to the bandwidth of synchronization signals (OFDM symbols) included in the DL signal. The shaped signal generated by the filter 710 is provided to a cell search unit 712 that carries out one or more methods of searching for cells as specified for the particular communication system, e.g., LTE, and as described above. Typically, such methods involve detecting predetermined primary and/or secondary synchronization channel (P/S-SCH) signals in the received signal.

The digitized baseband signal is also provided by the ADC 708 to a digital filter 714 that has the bandwidth $BW_0$, and the filtered digital baseband signal is provided to a processor 716 that implements a fast Fourier transform (FFT) or other suitable spectral decomposition algorithm that generates a frequency-domain (spectral) representation of the baseband signal. The cell search unit 712 exchanges suitable timing signals with the processor 716 for each candidate cell ID, i.e., each cell whose signal power (e.g., RSSI, RSRP) will be measured.

The cell search unit 712 also provides cell identifications and REs corresponding to RSs for each candidate cell to a channel estimation unit 718, which also receives timing signals from the processor 716 and generates a channel estimate $H_{i,j}$ for each of several subcarriers i and cells j. For example, the unit 718 can generate the channel estimates based on control signals provided by a control unit 720. The estimator 718 provides the channel estimates $H_i$ to a symbol detector 722 and further processing in the UE (not shown), and also to a signal power estimation unit 724 that generates received signal power measurements (e.g., estimates of RSSI, RSRP, RSRQ, received subcarrier power $S_i$, signal to interference ratio (SIR), etc.). The estimator 724 can generate such estimates in various ways that are known. The power estimates generated by the estimator 724 are typically also used in further signal processing in the UE.

The artisan will understand that the extended synchronization information can be carried by any suitable messages at any agreed time/place in a logical synchronization channel transmitted by a multi-carrier cell. The information elements that are included in extended synchronization information can indicate a number (e.g., in a range of 0 to N) of extra component carriers, the frequencies those extra component carriers have (e.g., radio channel numbers), and possibly also cell ID numbers on respective extra component carriers.

Those and other desired items of information are encoded into respective suitable numbers of bits (information elements) that can be included in messages on an existing channel, such as the shared data channel PDSCH in LTE Rel-8 compliant communication systems or as messages placed at specific time-frequency positions on a new extended synchronization channel. Using a PDSCH, the extended synchronization information is transported as control information over a data channel at positions where the PDSCH is transmitted. A new extended synchronization channel can be substantially similar to the P-SCH or S-SCH in LTE Rel-8 systems, with its symbols located, for instance, a predetermined number of OFDM symbols after (or before) the P-SCH symbols.

Figure 8:
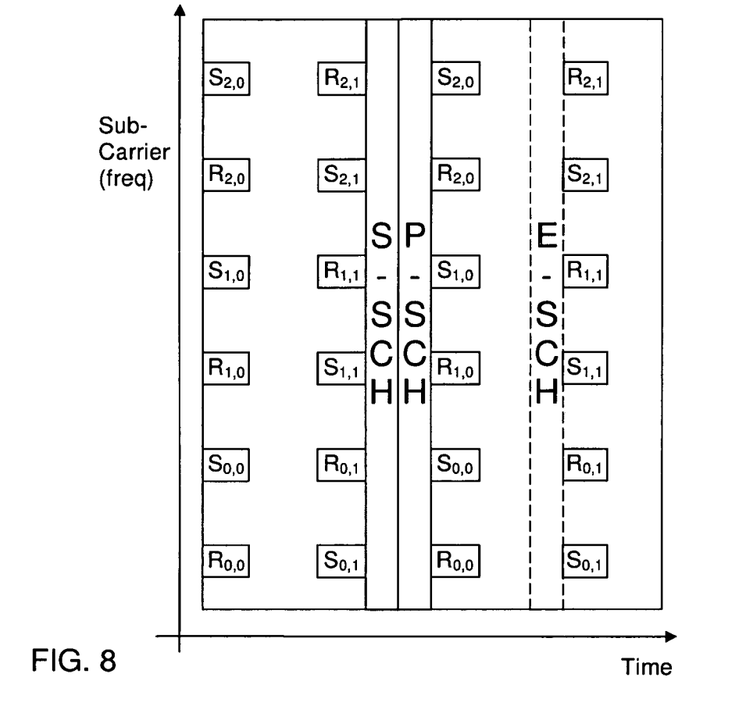
FIG. 8 depicts an example of an arrangement of symbols for an extended synchronization information channel.

FIG. 8 depicts an example of an arrangement of the symbols in an extended synchronization channel (E-SCH). Like FIG. 2, FIG. 8 shows sub-frames and a portion of the subcarrier frequency range with RSs in an LTE system. The first OFDM symbol in a slot is symbol 0. P-SCH and S-SCH symbols are transmitted in the middle six resource blocks in sub-frames 0 and 5, OFDM symbols 5, 6 (assuming the operation with the long cyclic prefix and frequency-division duplex (FDD)). As described above, the extended synchronization information can be transmitted an integer number m of OFDM symbols after the P-SCH, and as depicted in FIG. 8, m=3.

Figure 9:
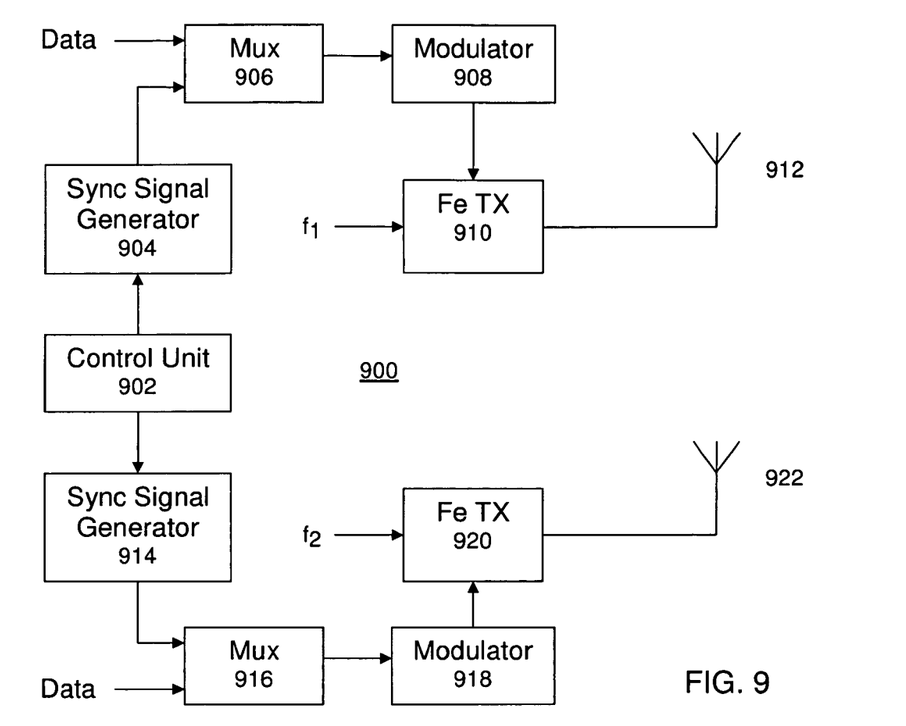
FIG. 9 is a block diagram of a portion of a transmitter in a multi-component carrier cell.

FIG. 9 is a block diagram of a portion of a transmitter 900 of a cell, such as multi-carrier cells 300, 310, 320, that can form and transmit the extended synchronization channel for the methods described above. It will be appreciated that the functional blocks depicted in FIG. 9 can be combined and re-arranged in a variety of equivalent ways, and that many of the functions can be performed by one or more suitably programmed digital signal processors and other known electronic circuits.

The transmitter 900 is operated by a control unit 902, which typically and advantageously is a suitably programmed digital signal processor. The control unit 902 typically provides and receives control and other signals from various devices in the transmitter 900, but for simplicity is shown providing respective cell IDs to a sync signal generator 904 and a sync signal generator 914. The generators 904, 914 include the respective cell IDs, e.g., cell ID a and cell ID b described above, in extended information included in P-SCH and/or S-SCH signals that are provided by the generators 904, 914 to respective multiplexers 906, 916, which combine the P-SCH and/or S-SCH signals with other data to be transmitted. The combined information streams produced by the multiplexers 906, 916 are converted by respective OFDM modulators 908, 918 into modulation symbols that are provided to respective transmitter front-ends (Fe TX) 910, 920, which impress the modulation symbols on respective carrier signals having frequencies $f_1$, $f_2$. The modulated carrier signals are transmitted through respective antennas 912, 922.

The methods and apparatus described in this application make it possible for a UE or other mobile device to connect—in an easy way—single-component carrier cell IDs to a multi-component carrier cell ID, and therefore to carry out cell search in multi-carrier systems. Furthermore, there is no need for coordinated cell ID planning on different carriers in a multi-component carrier system and also no need for neighboring-cell lists, reducing the need for extensive cell planning.

It will be appreciated that procedures described above are carried out repetitively as necessary, for example, to respond to the time-varying nature of communication signals exchanged by transmitters and receivers.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of searching for a cell having a multi-component carrier in a radio communication system, the method comprising:
    receiving a signal transmitted by the cell on a carrier frequency having a first predetermined frequency of the multi-component carrier of the cell, wherein the multi-component carrier of the cell comprises at least two component carriers with respective different carrier frequencies that combined provide a single physical communication link of the cell;
    determining a first cell identity (ID) based on the received signal according to a cell search procedure carried out on received signals at the first predetermined frequency;
    reading extended synchronization information about multi-component carriers that is broadcast by the cell on the first predetermined frequency, wherein the extended synchronization information includes a second cell ID associated with a second predetermined carrier frequency of the multi-component carrier of the cell; and based on the extended synchronization information, carrying out a cell search procedure on received signals at the second predetermined carrier frequency of the multi-component carrier of the cell in order to determine the cell having the second cell ID.

2. The method of claim 1, further comprising, if the second cell ID is detected, measuring powers of received signals at the first and second predetermined frequencies.

3. The method of claim 2, further comprising transmitting a report of the measured powers of received signals at the first and second predetermined frequencies.

4. The method of claim 2, further comprising forming a weighted combination of the measured powers of received signals at the first and second predetermined frequencies.

5. The method of claim 4, wherein the weighted combination is a weighted sum according to:

$$RSRP\_MC = \alpha * RSRP\_cell\_ID\_a + (1-\alpha) * RSRP\_cell\_ID\_b$$

in which RSRP_MC is the weighted combination, $\alpha$ is a weight factor, RSRP_cell_ID_a is the measured power of received signals at the first predetermined frequency, and RSRP_cell_ID_b is the measured power of received signals at the second predetermined carrier frequency.

6. The method of claim 5, wherein the weight factor $\alpha$ is 0.5.

7. The method of claim 5, wherein the weight factor $\alpha$ is a function of a measurement cycle on different component carriers.

8. The method of claim 1, further comprising measuring a received power at the first predetermined frequency before detecting a component carrier signal having the second predetermined carrier frequency.

9. The method of claim 1, further comprising transmitting information about a number of component carriers that have been detected.

10. The method of claim 1, wherein the extended synchronization information is carried by at least one message at a predetermined time on a predetermined sub-carrier in a logical synchronization channel.

11. The method of claim 10, wherein the extended synchronization information includes at least an information element that indicates a number of extra component carriers and an information element that indicates frequencies of indicated extra component carriers.

12. The method of claim 11, wherein the frequencies of indicated extra component carriers are indicated by radio channel numbers.

13. The method of claim 11, wherein the extended synchronization information further includes cell identification numbers on respective extra component carriers.

14. The method of claim 10, wherein the logical synchronization channel is transmitted on a physical downlink shared channel (PDSCH).

15. An apparatus in a receiver for searching for a cell having a multi-component carrier in a radio communication system, the apparatus comprising:

a device for receiving a signal transmitted by the cell on a carrier frequency having a first predetermined frequency of the multi-component carrier of the cell, wherein the multi-component carrier of the cell comprises at least two component carriers with respective different carrier frequencies that combined provide a single physical communication link of the cell; and an electronic processing device configured to determine a first cell identity (ID) based on the received signal according to a cell search procedure carried out on received signals at the first predetermined frequency;

wherein the electronic processing device is further configured to read extended synchronization information about multi-component carriers that is broadcast by the cell on the first predetermined frequency of the multi-component carrier of the cell; the extended synchronization information includes a second cell ID associated with a second predetermined carrier frequency of the multi-component carrier of the cell; and based on the extended synchronization information, the electronic processing device is further configured to carry out a cell search procedure on received signals at the second predetermined carrier frequency of the multi-component carrier of the cell in order to determine the cell having the second cell ID.

16. The apparatus of claim 15, further comprising a device configured to measure, if the second cell ID is detected, powers of received signals at the first and second predetermined frequencies.

17. The apparatus of claim 16, wherein the electronic processing device is further configured to determine a report of the measured powers of received signals at the first and second predetermined frequencies.

18. The apparatus of claim 16, wherein the electronic processing device is further configured to form a weighted combination of the measured powers of received signals at the first and second predetermined frequencies.

19. The apparatus of claim 18, wherein the weighted combination is a weighted sum according to:

$$RSRP\_MC = \alpha * RSRP\_cell\_ID\_a + (1-\alpha) * RSRP\_cell\_ID\_b$$

in which RSRP_MC is the weighted combination, $\alpha$ is a weight factor, RSRP_cell_ID_a is the measured power of received signals at the first predetermined frequency, and RSRP_cell_ID_b is the measured power of received signals at the second predetermined carrier frequency.

20. The apparatus of claim 15, further comprising a device configured to measure a received power at the first predetermined frequency before a component carrier signal having the second predetermined carrier frequency is detected.

21. A method of enabling searching for a cell having a multi-component carrier in a radio communication system, the method comprising:

generating a signal to be transmitted by the cell on a carrier frequency having a first predetermined frequency of the multi-component carrier of the cell, wherein the multi-component carrier of the cell comprises at least two component carriers with respective different carrier frequencies that combined provide a single physical communication link of the cell; the signal includes a first cell identity (ID) for determination by a cell search procedure and extended synchronization information about multi-component carriers;

and the extended synchronization information includes a second cell ID associated with a second predetermined carrier frequency of the multi-component carrier of the cell for determination of the second cell ID by a cell search procedure.

22. The method of claim 21, wherein the extended synchronization information is carried by at least one message at a predetermined time on a predetermined sub-carrier in a logical synchronization channel.

23. The method of claim 22, wherein the extended synchronization information includes at least an information element that indicates a number of extra component carriers and an information element that indicates frequencies of indicated extra component carriers.

24. The method of claim 23, wherein the frequencies of indicated extra component carriers are indicated by radio channel numbers.

25. The method of claim 23, wherein the extended synchronization information further includes cell identification numbers on respective extra component carriers.

26. An apparatus for a transmitter of a cell having a multi-component carrier in a radio communication system, the apparatus comprising:

at least first and second synchronization signal generators respectively corresponding to at least first and second component carriers of the multi-component carrier of the cell, the first and second component carriers having respective first and second predetermined carrier frequencies that combined provide a single physical communication link of the cell; and a control unit configured to provide and receive control and other signals to and from the at least first and second sync signal generators;

wherein the first and second generators include respective first and second cell identification (ID) information in extended information included in first and second synchronization signals produced by the at least first and second generators; and the first and second cell ID information correspond to respective component carriers of the multi-component carrier of the cell and enable determinations of first and second cell IDs by respective cell search procedures.

27. The apparatus of claim 26, further comprising a device configured to impress the first and second synchronization signals on respective component carriers.

28. The apparatus of claim 27, wherein each of the first and second synchronization information is carried by at least one message at a predetermined time on a predetermined subcarrier in a logical synchronization channel.

29. The apparatus of claim 28, wherein each of the first and second synchronization information includes at least an information element that indicates a number of extra component carriers and an information element that indicates frequencies of indicated extra component carriers.

30. The apparatus of claim 29, wherein frequencies of indicated extra component carriers are indicated by radio channel numbers.

31. The apparatus of claim 27, wherein the extended information further includes cell identification numbers on respective extra component carriers.

* * * * *

UNITED STATES PATENT AND TRADEMARK OFFICE
CERTIFICATE OF CORRECTION

PATENT NO. : 8,711,811 B2  
APPLICATION NO. : 12/326658  
DATED : April 29, 2014  
INVENTOR(S) : Lindoff et al.

It is certified that error appears in the above-identified patent and that said Letters Patent is hereby corrected as shown below:

In the Specification

In Column 1, Line 43, delete "1.25 MHz 30" and insert -- 1.25 MHz --, therefor.

Signed and Sealed this
Seventh Day of October, 2014

Michelle K. Lee
*Deputy Director of the United States Patent and Trademark Office*